United States Patent Office 3,474,147

Patented Oct. 21, 1969

1

2

3,474,147

THIOBIS-BENZYL CRESOL

Urho A. Lehikoinen, Detroit, Mich., assignor to Ethyl Corporation, New York, N.Y., a corporation of Virginia No Drawing. Filed July 15, 1966, Ser. No. 565,391
Int. Cl. C07c *149/36*
U.S. Cl. 260—609 1 Claim

ABSTRACT OF THE DISCLOSURE

Organic material is stabilized against oxidative degradation by alpha-alkylbenzyl-substituted α,α'-thiobis-p-cresols such as α,α' - thiobis[2,6 - di-(α-methylbenzyl)-p-cresol]. Effectiveness is synergistically increased by including a dialkylthiodialkanoate, a phosphite or a phosphonate.

This invention relates to alpha-alkylbenzyl substituted α,α'-thiobis-p-cresols and, in particular, to their use as antioxidants, both alone and in synergistic combinations.

Most organic materials undergo degradation in the presence of oxygen. This degradation is accelerated at elevated temperatures. Frequently, high temperatures are encountered during the processing of these materials in manufacturing operations and thus some form of stabilizer is required for many materials during the manufacturing stage. Other materials are not subject to extremes in temperatures during manufacture, but even these undergo degradation on aging.

An object of this invention is to provide an additive capable of preventing degradation of organic materials due to oxygen. A further object of this invention is to provide organic materials of increased stability against the effects of elevated temperatures during manufacture which are also stable during long periods of aging under normal conditions. A particular object is to provide polyolefins, for example, polypropylenes, of exceptionally high temperature stability and capable of resisting degradation due to oxygen during long periods of use. Other objects will become apparent from the following description of the invention.

The above and other objects are accomplished by providing an antioxidant compound having the formula:

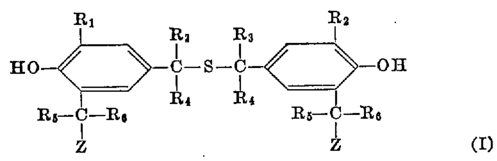

(I)

wherein $R_1$ and $R_2$ are selected from the group consisting of hydrogen, alkyl radicals containing from 1–20 carbon atoms, aryl radicals containing from 6–20 carbon atoms, aralkyl radicals containing from 7–20 carbon atoms and cycloalkyl radicals containing from 6–20 carbon atoms; $R_3$ and $R_4$ are selected from the group consisting of hydrogen and lower alkyl radicals containing from about 1–3 carbon atoms; $R_5$ is selected from the group consisting of hydrogen and lower alkyl radicals containing from 1–3 carbon atoms; $R_6$ is an alkyl radical containing from 1–3 carbon atoms; and Z is an aromatic hydrocarbon radical containing from 6–20 carbon atoms.

Some examples of compounds falling within this definition of the antioxidant compounds are:

α,α'-thiobis[2-(α,α-dimethyl-benzyl)-4-ethylphenol],
α,α'-thiobis[2-(α,α-dimethyl-4-dodecylbenzyl)-4-isopropyl-6-tert-butylphenol],
α,α'-thiobis[2-(α-methylbenzyl)-6-tert-butyl-p-cresol],
α,α'-thiobis[2-(α,α-dimethylbenzyl)-6-cyclohexyl-p-cresol],
α,α'-thiobis[2-(2-phenylbenzyl)-6-(4-tert-octylcyclohexyl)-4-n-butylphenol],
α,α'-thiobis(2-benzyl-6-phenyl-p-cresol),
α,α'-thiobis[2-(α-methylbenzyl)-6-tert-decyl-p-cresol],
α,α'-thiobis[2-(α,α,2,4,6-penta-methylbenzyl)-6-cyclohexyl-p-cresol],
α,α'-thiobis[2-(α-ethyl-2,4-benzobenzyl)-6-isopropyl-p-cresol],
α,α'-thiobis[2-(2,4,6-tri-tert-butylbenzyl)-6-tert-eicosyl-p-cresol],
α,α'-thiobis[2-(α,α-dimethylbenzyl)p-cresol], and the like.

In a preferred embodiment of this invention $R_1$ and $R_2$ are aralkyl radicals having the formula:

$$Z-\underset{R_6}{\overset{R_5}{\underset{|}{\overset{|}{C}}}}- \quad \text{(II)}$$

wherein $R_5$, $R_6$ and Z are the same as defined above. Some examples of these preferred compounds are:

α,α'-thiobis[2,6-di(α-methylbenzyl)p-cresol],
α,α' - thiobis[2 - (α,α-dimethylbenzyl)-6-(α-methyl-2,4,6-tri-tert-butylbenzyl)p-cresol],
α,α'-thiobis[2-(α-methylbenzyl)-6-(α,α-dimethylbenzyl)p-cresol],
α,α'-thiobis[2,6-di(α-n-propylbenzyl)p-isopropylphenol],
α,α'-thiobis[2,6-di(α-methyl-4-phenylbenzyl)-p-n-butylphenol], and the like.

Some highly preferred antioxidant compounds are:

α,α'-thiobis[2,6-di(α-methylbenzyl)p-cresol],
α,α'-thiobis[2-methyl-6-(α,α-dimethylbenzyl)p-cresol],
α,α'-thiobis[2-(α,α-dimethylbenzyl)p-cresol], and
α,α'-thiobis[2-cyclohexyl-6-(α-methylbenzyl)p-cresol].

These compounds may be prepared by methods known in the art. For example, a suitable procedure is taught in U.S. 3,065,275, issued Nov. 20, 1962. Essentially, this procedure comprises forming the benzyl chloride derivative of the phenolic portion of the compound and reacting this with sodium sulfide to form the thio bridge. For example, 3,5-di(α-methylbenzyl)-4-hydroxybenzyl chloride reacts with sodium sulfide to yield α,α'-thiobis[2,6-di (α-methylbenzyl)p-cresol]. This reaction is illustrated by the following equation:

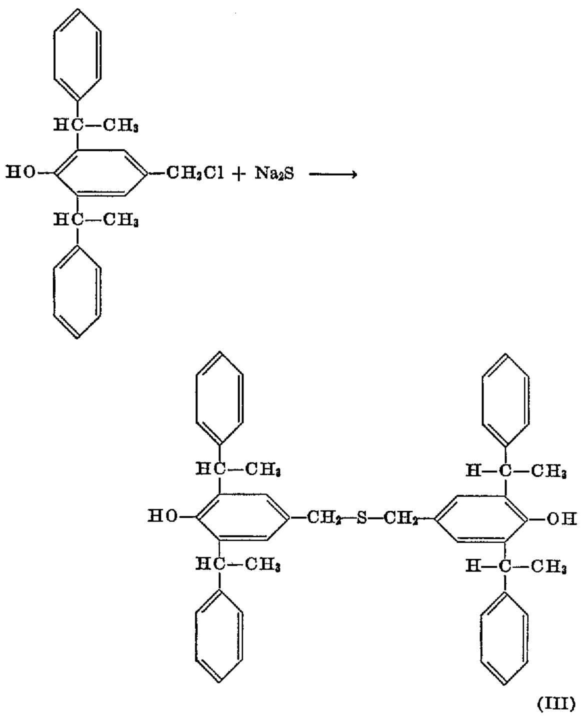

(III)

The following examples serve to illustrate the preparation of the antioxidant compounds of this invention. All parts are parts by weight unless otherwise specified.

EXAMPLE 1

To a reaction vessel equipped with stirrer, thermometer and heating means is added a solution of 350 parts of 3,5-di(α-methylbenzyl)-4-hydroxybenzyl chloride in 700 parts of isopropanol. To this is added a solution of 45 parts of sodium sulfide in 100 parts of hot water. While stirring, the mixture is heated to reflux and held at this temperature for 8 hours. Following this, the mixture is cooled and 100 parts of water added. The precipitate is removed and purified by recrystallization from isooctane, yielding α,α'-thiobis[2,6-di(α-methylbenzyl)p-cresol].

The above procedure is easily adapted to prepare other antioxidant compounds of this invention. For example, 3 - methyl - 5 - (α,α - dimethylbenzyl) - 4 - hydroxybenzyl chloride reacts with sodium sulfide to form α,α'-thiobis[2 - methyl - 6 - (α,α - dimethylbenzyl)p-cresol]. In like manner, 3(α,α - dimethylbenzyl) - 4 - hydroxybenzyl chloride reacts with sodium sulfide forming α,α'-thiobis[2 - (α,α - dimethylbenzyl)p - cresol]. Likewise, 3 - cyclohexyl - 5 - (α - methylbenzyl) - 4 - hydroxybenzyl chloride results in α,α' - thiobis[2 - cyclohexyl-6 - (α - methylbenzyl)p - cresol].

The following example illustrates another method of preparing the AN compounds of this invention directly from the appropriate benzyl substituted phenol through reaction with formaldehyde and sodium sulfide.

EXAMPLE 2

To a reaction vessel fitted with stirrer, thermometer and heating means was added 60.4 parts of 2,6 - di(α-methylbenzyl)phenol, 6.3 parts of 95 percent paraformaldehyde, 24 parts of sodium sulfide hydrate and 200 parts of methanol. The mixture was heated to 50° C. while stirring, and held at this temperature for 18 hours. Following this, the mixture was poured into 2000 parts of water. The aqueous mixture was neutralized with hydrochloric acid and the solids that formed were filtered off. The solids were redissolved in 500 parts of methanol and again precipitated by addition to 1000 parts of water.

The product was filtered off yielding 57 parts of α,α'-thiobis[2,6 - di(α - methylbenzyl)p - cresol]. This is an 86 percent yield.

Similarly, other benzyl substituted thiobis compounds of this invention can be prepared following the procedure of Example 2. The procedure need merely be changed by adding an equal mole quantity of a phenol corresponding to the phenolic portion of any of the previously listed antioxidant compounds.

The compounds of this invention are extremely useful as antioxidants in a wide variety of organic material normally susceptible to deterioration in the presence of oxygen. Thus, liquid hydrocarbon fuels such as gasoline, kerosene and fuel oil are found to possess increased storage stability when blended with a stabilizing quantity of an additive of this invention. Likewise, hydrocarbon fuels containing organometallic additives such as tetraethyllead, tetramethyllead, methyl cyclopentadienyl manganese tricarbonyl, cyclopentadienyl nickel nitrosyl, ferrocene, methylferrocene and iron carbonyl have appreciably increased stability when treated with the additives of this invention. Furthermore, lubricating oils and functional fluids, both those derived from naturally occurring hydrocarbons and those synthetically prepared, have greatly enhanced stability by the practice of this invention. The additives of this invention are extremely useful in stabilizing antiknock fluids against oxidative degradation. For example, the stabilizing additives of this invention find utility in stabilizing a tetraethyllead antiknock fluid which contains ethylenedichloride and ethylenedibromide.

The additives of this invention are effective in stabilizing rubber against degradation caused by oxygen or ozone. As used in the description, the term "rubber" is employed in a generic sense to define a high molecular weight plastic material which presses high extensibility under load coupled with the property of forcibly retracting to approximately its original size and shape after the load is removed. Some examples are acrylic rubber, butadiene-styrene rubber (SBR), chloroprene, chlorosulfonated polyethylene, fluorocarbon rubbers, isobutylene-isoprene (IIR), isoprene, butadiene, nitrile-butadiene rubber, polyisobutylene rubber, polysulfide rubbers, silicone rubbers, urethanes, India rubber, reclaimed rubber, balata rubber, gutta percha rubber, and the like. Both natural rubber and synthetic rubbers such as neoprene, SBR rubber, EPT rubber, GR-N rubber, chloroprene rubber, polyisoprene rubber, EPR rubber, poly-cis-butadiene, and the like, are greatly stabilized through the practice of this invention.

The compounds of this invention are also useful in protecting petroleum wax against degradation. The additives also find use in the stabilization of fats and oils of animal and vegetable origin which tend to become rancid during long periods of storage because of oxidative deterioration. Typical representatives of these edible fats and oils are linseed oil, cod liver oil, castor oil, soy bean oil, rapeseed oil, coconut oil, olive oil, palm oil, corn oil, sesame oil, peanut oil, babassu oil, butter, lard, beef tallow, and the like.

The compounds of this invention are superior antioxidants for high molecular weight polyolefins such as polyethylene and polypropylene (both high pressure and so-called Ziegler types), polybutene, polybutadiene (both cis and trans), and the like.

One of the features of the present stabilizers is that they do not cause discoloration when used in transparent, white, or light-colored organic materials such as white rubber or plastics such as polyethylene, polypropylene, and the like.

The amount of stabilizer used in the organic compositions of this invention is not critical, as long as a stabilizing quantity is present, and can vary from a little as 0.001 weight percent to about 5 weight percent. Generally, excellent results are obtained when from 0.1 to about 3 weight percent of the stabilizer is included in the organic compositions.

The following examples serve to illustrate the use of the stabilizers of the present invention in stabilizing some representative organic materials normally subject to deterioration in the presence of oxygen or ozone.

EXAMPLE 3

A rubber stock is prepared containing the following components:

| Component: | Parts |
|---|---|
| Pale crepe rubber | 100 |
| Zinc oxide filler | 50 |
| Titanium dioxide | 25 |
| Stearic acid | 2 |
| Ultramarine blue | 0.12 |
| Sulfur | 3.00 |
| Mercaptobenzothiazole | 1.00 |

To the above base formula is added one part by weight of α,α′-thiobis[2,6-di(α-methylbenzyl)p-cresol], and, following this, individual samples are cured for 20, 30, 45 and 60 minutes, respectively, at 274° C. After cure, all of these samples remain white in color and possess excellent tensile strength. Furthermore, they are resistant to degradation caused by either oxygen or ozone on aging.

EXAMPLE 4

A synthetic rubber master batch comprising 100 parts of GR–S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is prepared. To this is added 1.5 parts of α,α′-thiobis-[2-(α,α-dimethylbenzyl)-6-methyl-p-cresol]. This composition is then cured for 60 minutes employing 45 p.s.i.g. of steam pressure. The resulting synthetic rubber possesses resistance to oxygen and ozone induced degradation.

EXAMPLE 5

A butadiene acrylonitrile copolymer is prepared from 68 percent 1,3-butadiene and 32 percent acrylonitrile. Two percent, based on the weight of the copolymer, of α,α′-thiobis[2-(α-methylbenzyl)-6-tert-butyl-p-cresol] is added as an aqueous emulsion to the latex obtained from emulsion copolymerization of the butadiene and acrylonitrile monomers. The latex is coagulated with aluminum sulfate and the coagulum, after washing, is dried for 20 hours at 70° C. The synthetic copolymer so obtained is resistant to oxidative degradation.

EXAMPLE 6

Three percent of α,α′-thiobis[2-(α,α-dimethylbenzyl)-p-cresol] as an emulsion in sodium oleate is added to a rubber-like copolymer of 1,3-butadiene and styrene containing 25 percent styrene. The resulting synthetic elastomer possesses enhanced stability.

EXAMPLE 7

To a master batch of GR–N synthetic rubber containing 100 parts of GR–N rubber, 5 parts of zinc stearate, 50 parts of carbon black, 5 parts of road tar, 2 parts of sulfur and 2 parts of mercaptobenzothiazole is added 5 percent, based on weight, of α,α′-thiobis[2-cyclohexyl-6-(α,α-dimethylbenzyl)-p-cresol]. After curing, a synthetic rubber is obtained of improved oxidative stability.

EXAMPLE 8

To a master batch of polyethylene having an average molecular weight of 1,000,000, a tensile strength of 6,700 p.s.i., a Shore D hardness of 74 and a softening temperature under low load of 150° C. is added 5 percent of α,α′-thiobis[2-sec-butyl-6-(α,2,4,6-tetramethylbenzyl)-p-isopropylphenol]. The resulting polyethylene possesses stability against oxidative degradation and shows no tendency to yellow after extensive aging.

EXAMPLE 9

A linear polyethylene having a high degree of crystallinity (93 percent), and less than one branched chain per 100 carbon atoms, a density of about 0.96 gram per ml. and which has about 1.5 double bonds per 100 carbon atoms, is mixed with 0.005 weight percent of α,α′-thiobis[2,6-di(α-methylbenzyl)-p-cresol]. The resulting polyethylene is found to possess stability against oxidative degradation.

EXAMPLE 10

To 100 parts of an ethylenepropylene terpolymer is added 3 parts of α,α-thiobis[2-(α,α-diethylbenzyl)-6-phenyl-p-cresol], resulting in an ethylenepropylene terpolymer of enhanced stability.

EXAMPLE 11

To 100 parts of an ethylenepropylene rubber is added 2 parts of α,α′-thiobis[2-(α,α-dimethylbenzyl)-6-cyclohexyl-p-cresol], resulting in an EPR rubber stock of improved stability.

EXAMPLE 12

After the polymerization of polypropylene in a hexane solvent employing a Ziegler catalyst, the catalyst is neutralized with water and α,α′-thiobis[2,6-di(α-methylbenzyl)-p-cresol] is added to the mixture in quantities such that, after evaporation of the solvent, a Ziegler polypropylene is obtained containing 2 percent of α,α′-thiobis[2,6-di(α-methylbenzyl)-p-cresol]. This polypropylene is found to possess excellent stability against degradation caused by oxygen or ozone. Furthermore, this polypropylene is found to resist degradation at elevated temperatures, even in the presence of oxygen. During this high temperature aging the Ziegler polypropylene shows no tendency to discolor.

EXAMPLE 13

To 1,000 parts of a gasoline containing 26.6 percent aromatics, 20.8 percent olefins, 52.6 percent saturates and having an API gravity of 62.1 is added 10 parts of α,α′-thiobis(2-benzyl-6-phenyl-p-cresol). The resulting gasoline is stable.

EXAMPLE 14

To 10,000 parts of gasoline containing 8.6 percent aromatics, 7.9 percent olefins, 83.5 percent saturates and having an API gravity of 68.5 is added 200 parts of α,α′-thiobis[2-(α-methylbenzyl)-6-tert-decyl-p-cresol]. The resulting gasoline is stable against oxidative degradation.

EXAMPLE 15

To 10,000 parts of a gasoline containing 20.0 percent aromatics, 41.2 percent olefins, 38.8 percent saturates and containing additionally 1.5 grams of manganese per gallon as methyl cyclopentadienyl manganese tricarbonyl is added 300 parts of α,α′-thiobis[2-(α-methyl-naphthyl)-6-cyclohexyl-p-cresol]. The resulting gasoline containing a manganese antiknock was resistant to oxidative degradation.

EXAMPLE 16

To 10,000 parts of a gasoline containing 20.5 percent aromatics, 32.9 percent olefins and 46.6 percent saturates and containing 2.39 grams per gallon of tetraethyllead and one theory of chlorine as ethylenedichloride and 0.5 theory of bromine as ethylenedibromide is added 500 parts of α,α′-thiobis[2-(α-methyl-2,4-di-tert-butyl-benzyl)-6-methyl-p-cresol]. The resulting gasoline containing a lead antiknock and halogen scavenger is resistant to oxidative degradation.

EXAMPLE 17

To 10,000 parts of gasoline containing 38.1 percent aromatics, 7.3 percent olefins and 54.6 percent saturates and which contains 3.17 grams per gallon of lead as tetramethyllead, one theory of chlorine as ethylenedichloride, 0.5 theory of bromine as ethylenedibromide and 0.2 theory of phosphorus as tris($\beta$-chloro-isopropyl)thionophosphate is added 50 parts of $\alpha,\alpha'$-thiobis[2-(2,4,6-tri-tert-butylbenzyl)-6-tert-eicosyl-p-cresol]. The resulting gasoline is resistant to degradation.

EXAMPLE 18

An antiknock fluid composition is prepared by mixing together 61.5 parts of tetraethyllead, 17.9 parts of ethylenedibromide, 18.8 parts of ethylenedichloride and 1.3 parts of $\alpha,\alpha'$-thiobis[2-methyl-6-($\alpha$-methyl-2,4-diphenylbenzyl)p-cresol], resulting in a stable antiknock fluid composition.

EXAMPLE 19

To 1,000 parts of a commercial diesel fuel having a cetane number of 42, is added 5 parts of amyl nitrate and 4 parts of $\alpha,\alpha'$-thiobis[2-isopropyl-6-($\alpha,\alpha$-dimethylbenzyl)p-cresol], resulting in a diesel fuel of high resistance to oxidative deterioration which does not form gum or sludge on storage.

EXAMPLE 20

To 1,000 parts of a solvent refined neutral oil (95 viscosity index and 200 SUS at 100° F.) containing 6 percent of a commercial methacrylate type B–1 improver is added 5 percent of $\alpha,\alpha'$-thiobis[2-($\alpha$-methylbenzyl)-6-(2,4,6-trimethylcyclohexyl)-p-cresol], resulting in a stable lubricating oil.

EXAMPLE 21

To a solvent refined crankcase lubricating oil having a viscosity index of 95 and a SAE viscosity of 10 is added 0.1 percent of $\alpha,\alpha'$-thiobis[2-($\alpha,\alpha$-dimethylbenzyl)-6-sec-dodecyl-p-cresol]. The resulting oil was stable against oxidation degradation.

EXAMPLE 22

To 100,000 parts of a petroleum hydrocarbon lubricating oil having a gravity of 30.3° API at 60° F., viscosity of 178.8 SUS at 100° F., a viscosity index of 154.2, and containing 1,000 parts of the reaction product of an alkenyl succinic anhydride where the alkenyl group has a molecular weight of 1,200, with tetraethylenepentamine, is added 200 parts of $\alpha,\alpha'$-thiobis[2-($\alpha,\alpha$-dimethylbenzyl)-p-cresol]. The resulting lubricating oil possesses excellent dispersancy and is resistant to oxidative degradation.

EXAMPLE 23

To 100,000 parts of a commercially available pentaerythritol ester having a viscosity at 100° F. of 22.4 centistokes and known under the trade name of "Hercoflex 600" is added 400 parts of $\alpha,\alpha'$-thiobis[2-($\alpha,\alpha$-dimethylbenzyl)-6-cyclohexyl-p-cresol]. The resulting synthetic lubricating oil possesses improved resistance against oxidative deterioration.

EXAMPLE 24

To 100,000 parts of dioctyl sebacate having a viscosity at 210° F. of 36.7 SUS, a viscosity index of 159, and a molecular weight of 427, is added 250 parts of $\alpha,\alpha'$-thiobis[2-($\alpha$-methylbenzyl)-6-tert - octadecyl-p-ethylphenol], resulting in a synthetic diester lubricating oil having improved resistance to oxidative degradation.

EXAMPLE 25

To 1,000 parts of a commercial coconut oil is added 5 parts of $\alpha,\alpha'$-thiobis[2,6-di($\alpha$-methylbenzyl)-p-cresol], resulting in a vegetable oil with good aging characteristics.

EXAMPLE 26

To 100,000 parts of lard is added 100 parts of $\alpha,\alpha'$-thiobis[2-($\alpha,\alpha$-dimethylbenzyl)-6-benzyl-p-cresol], resulting in a lard having resistance to rancidity.

The stabilizing additives of this invention are eminently useful as stabilizers in polyolefins such as polyethylene, polypropylene, and the like. In this use they function as antioxidants, antiozonants and also as thermal stabilizers. They are extremely long lasting and highly resistant to the formation of color.

In order to demonstrate their vastly superior stabilization effect, tests were conducted using a commercial polypropylene. These tests are known as "Oven Aging Tests" and are recognized in the plastic industry as an accurate guide to oxidative stability. In these tests, small specimens of polypropylene are prepared containing the test stabilizer. These test specimens are placed in an air circulating oven maintained at 150° C. Five replicates are made of each polypropylene-stabilizer composition and the test criteria is the time and hours until three of the five replicates show signs of deterioration. Deterioration is evidenced by cracking, discoloration or any visual appearance of change in the specimen.

Test specimens are prepared by mixing the test stabilizers with polypropylene powder for 3 minutes in a Waring Blendor. The mixture is then molded into a 6" x 6" sheet with a thickness of either 0.025" or 0.0625". This is accomplished in a molding press at 400° F. under 5,000 p.s.i. pressure. Each sheet is then cut into ½" x 1" test specimens in order to obtain the five replicate samples. These samples are then subjected to the Oven Aging Tests.

In order to compare the stabilizing additives of this invention, tests were carried out employing several commercially accepted stabilizers along with the preferred stabilizer of the present invention. The results obtained are shown in the following table.

| Additive | Conc. (Wt. percent) | Sample thickness, mil | Hours to failure |
|---|---|---|---|
| (1) None |  | 25 | 2.5 |
| (2) 2,6-di-tert-butyl-4-methylphenol | 0.3 | 25 | 16 |
| (3) 2,2'-methylenebis-(4-methyl-6-tert-butylphenol) | 0.3 | 25 | 112 |
| (4) 4,4'-thiobis(2-tert-butyl-5-methylphenol) | 0.3 | 25 | 96 |
| (5) $\alpha,\alpha'$-thiobis[2,6-di($\alpha$-methylbenzyl)-p-cresol] | 0.3 | 25 | 664 |
| (6) $\alpha,\alpha'$-thiobis[2,6-di($\alpha$-methylbenzyl)-p-cresol] | 0.3 | 62 | >1,512 |

As the above table shows, the additive of the present invention increased the oven life of the polypropylene almost 250 times that obtained without any additive, and about 6–7 times as much as the life obtained with two commercially accepted antioxidants. Thus, it can be seen that the additives of the present invention are vastly superior to stabilizers available in the prior art.

The effectiveness of the present stabilizers can be enhanced still further by employing synergistic mixtures of the stabilizers of this invention. The preferred synergists are selected from the group consisting of compounds having the formula:

$$S\left[R_7-COOR_8\right]_2 \qquad \text{(IV)}$$

wherein $R_7$ is a divalent hydrocarbon radical containing from 1–6 carbon atoms and $R_8$ is selected from the group consisting of alkyl radicals containing from 6–20 carbon atoms, aryl radicals containing from 6–20 carbon atoms, aralkyl radicals containing from 7–20 carbon atoms; and compounds having the formula:

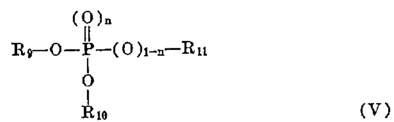

(V)

wherein $n$ is an integer from 0–1 and $R_9$, $R_{10}$ and $R_{11}$ are independently selected from the group consisting of alkyl radicals containing from 1–20 carbon atoms, aralkyl radicals containing from 7–20 carbon atoms, aryl radicals containing from 6–20 carbon atoms and alkaryl radicals containing from 7–20 carbon atoms. Some examples of synergists are dilaurylthiodipropionate, diamylthiodiacetate, β,β' - thiobis(cetylbutyrate), dieicosylthiodiheptoate, diphenylthiodipropionate, dibenzylthiodibutyrate, didecylthiodipropionate, dihexylthiodiacetate, trinonylphosphite, triphenylphosphite, trimethylphosphite, tri-n-butylphosphite, tributylphosphonate, tri - p - nonylphenylphosphite, tricresylphosphite, trinonylphosphate, tricetylphosphite, tricyclohexylphosphite, and the like. Preferred synergists are represented by Formula IV wherein $R_7$ contains from 1–3 carbon atoms and $R_8$ is an alkyl radical containing from 10–18 carbon atoms. The most preferred synergists are dilaurylthiodipropionate and distearylthiodipropionate.

The ratio of synergist to stabilizing compound should be adjusted to give the desired protection at the least cost. Mixtures containing from 1 percent synergist and 99 percent stabilizer to those containing 99 percent synergist and 1 percent stabilizer can be employed. A more useful range is from 10–90 percent. Best results are usually obtained with stabilizing mixtures containing from 50 to 66 percent synergist and from 34 to 50 percent stabilizing compound.

The synergists can be employed to obtain increased stability using the same concentration of stabilizer or they can be employed to obtain the same stability with less of the stabilizer. Synergists are especially useful in this latter application. Thus, although dilaurylthiodipropionate (DLTDP) is only moderately effective by itself in stabilizing polypropylene, when used with a compound of the present invention a synergist interaction occurs, resulting in a degree of stability totally unexpected from the amount of stabilizers employed. This effect is shown in the following data obtained using the previously described Oven Aging Test.

| Additive | Conc. (Wt. percent) | Sample thickness, mil | Hours to failure |
|---|---|---|---|
| (1) Dilaurylthiodipropionate | 0.3 | 25 | 288 |
| (2) α,α'-thiobis[2,6-di(α-methylbenzyl)p-cresol] | 0.3 | 25 | 664 |
| (3) α,α'-thiobis[2,6-di(α-methylbenzyl)p-cresol] | 0.1 | | |
| Dilaurylthiodipropionate | 0.2 | 25 | 1,312 |

As the above results show, there is a striking synergistic response when an antioxidant compound of this invention is used in combination with a synergist. Dilaurylthiodipropionate itself provides only a moderate amount of protection for polypropylene at 0.3 weight percent concentration. However, when used in combination with α,α' - thiobis[2,6 - di(α - methylbenzyl)p - cresol], over twice as much protection is obtained compared to the protection afforded by the same amount of the antioxidant used alone. The following table lists some useful synergistic combinations.

(1) 66%—dilaurylthiodipropionate; 34%—α,α'-thiobis[2,6-di(α-methylbenzyl)p-cresol]
(2) 90%—dicetylthiodipropionate; 10%—α,α'-thiobis[2-cyclohexyl-6-(α,α-dimethylbenzyl)p-cresol]
(3) 10%—diamylthiodiacetate; 90%—α,α'-thiobis[2-methyl-6-(α,α-dimethylbenzyl)p-cresol]
(4) 50%—dioctadecylthiodipropionate; 50%—α,α'-thiobis[2-(α,α-dimethylbenzyl)p-cresol]
(5) 50%—trinonylphosphite; 50%—α,α'-thiobis[2,6-di(α-methylbenzyl)p-cresol]
(6) 10%—tri-p-nonylphenylphosphite; 90%—α,α'-thiobis[2-methyl-6-(α,α-dimethylbenzyl)p-cresol]
(7) 90%—tributylphosphonate; 10%—α,α'-thiobis[2-cyclohexyl-6-(α-methylbenzyl)p-cresol]

The above synergistic combinations are useful in any of the previously described organic materials. The organic compositions are prepared as shown in the previous examples by merely adding the synergistic combination in place of the antioxidant compound.

I claim:

1. α,α'-Thiobis[2,6-di(α-methylbenzyl)-p-cresol].

References Cited

UNITED STATES PATENTS

| | | | |
|---|---|---|---|
| 3,060,121 | 10/1962 | Orloff et al. | 260—609 XR |
| 3,272,869 | 9/1966 | O'Shea | 260—609 XR |
| 3,274,528 | 9/1966 | Odenweller | 260—609 |

CHARLES B. PARKER, Primary Examiner

D. R. PHILLIPS, Assistant Examiner

U.S. Cl. X.R.

44—68, 69; 252—46.6, 48.2, 48.6, 386, 400, 404, 45.95, 398.5, 799, 958